United States Patent [19]

Uezono

[11] Patent Number: 4,993,721
[45] Date of Patent: Feb. 19, 1991

[54] SEAL EQUIPMENT FOR ROTARY SHAFT MOVABLE IN THE AXIAL DIRECTION

[75] Inventor: Teiji Uezono, Tokyo, Japan

[73] Assignee: Tanken Seiko Kabushiki Kaisha, Tokyo, Japan

[21] Appl. No.: 320,951

[22] Filed: Mar. 9, 1989

[30] Foreign Application Priority Data

Apr. 8, 1988 [JP] Japan ................................ 63-86754

[51] Int. Cl.$^5$ ........................ F16J 15/34; F16J 15/38
[52] U.S. Cl. ...................................... 277/30; 277/59; 277/65; 277/81 R; 277/91; 277/93 R
[58] Field of Search ................... 277/58, 59, 83, 93 R, 277/93 SP, 30, 97, 98, 99, 91, 65, 81 R

[56] References Cited

U.S. PATENT DOCUMENTS 4,381,867  5/1983  Ohgoshi ....................... 277/93 SP Primary Examiner—Allan N. Shoap
Attorney, Agent, or Firm—Henry C. Nields

[57] ABSTRACT

The space between a rotary shaft movable in the axial direction within and extending from a casing is sealed by a rotary shaft seal component mounted around the rotary shaft and on a cylindrical pipe between the casing and the rotary shaft. The cylindrical pipe is movable in the axial direction in synchronism with the rotary shaft, but does not rotate therewith. Two seals movable in the axial direction are provided for sealing off the space between the casing and the cylindrical pipe.

7 Claims, 4 Drawing Sheets

SEAL EQUIPMENT FOR ROTARY SHAFT MOVABLE IN THE AXIAL DIRECTION

BACKGROUND OF THE INVENTION

The present invention relates to a seal structure for sealing a rotary shaft movable in the axial direction.

A rotary shaft rotated by motive power is utilized in many fields. In agitating devices, a rotary shaft is utilized to rotate an agitating blade to stir an object. Some agitating devices use a rotary shaft movable in the axial direction in order to change the position of the stirring action, which can increase the efficiency of the stirring action.

For sealing such an axially movable shaft, gland packing or segment seals, which permit the movement of the shaft in the axial direction, are exclusively utilized.

Since gland packings or segment seals are shaft-circumference seals and there is a gap at the circumference of the shaft, a substance in the machine where the shaft is mounted sometimes leaks out of the gap when the pressure of the interior of the machine is higher than atmospheric pressure. On the other hand, when pressure of the interior of the machine is less than atmospheric pressure, the air is sometimes introduced into the interior of the machine through the gap. Furthermore gland packings or segment seals are not able to maintain the seal because the contact points to the shaft vary as a result of the axial movement of the shaft.

Though a mechanical seal does not have said problems of gland packings or segment seals, it is unable to permit axial movement of the shaft.

SUMMARY OF THE INVENTION

It is an object of the invention to provide a seal structure which can move in the axial direction.

Another object of the invention is to provide a seal structure which can follow axial movement of the shaft without leakage of substances in the machine and without introducing air into the machine.

A further object of the invention is to provide a seal structure which can so utilize a mechanical seal as to be able to move in the axial direction.

In agitating devices or the like, a rotary shaft extends from a vessel with which the substance to be stirred is filled. The rotary shaft has a blade at the end thereof which is in the vessel and is rotated by a motor or the like to stir the substance. The rotary shaft is axially moved up and down by an appropriate means.

In accordance with the invention, a rotary shaft seal means is provided around the rotary shaft for providing a seal at the circumference of the shaft which is mounted within a casing. The casing may be part of the vessel or it may be adapted to the vessel as a separate part. A cylindrical pipe is so provided between the rotary shaft seal means and the casing as to be movable in the axial direction. The space between the cylindrical pipe and the casing is sealed by a first seal, and the space between the cylindrical pipe and the rotary shaft seal means is sealed by a second seal.

When the rotary shaft moves in the axial direction, the rotary shaft seal means mounted around the shaft moves together with the shaft. And the cylindrical pipe and the first seal move in the axial direction following the axial movement of the shaft and the rotary shaft seal means. Furthermore, the second seal moves in the axial direction sliding on the casing.

In such operation, the rotary shaft seal means does not slide on any other part. The rotary shaft seal means moves axially together with the circumferential parts: that is to say, the rotary shaft seal means moves axially together with the rotary shaft, the first seal and the cylindrical pipe. Consequently, a mechanical seal or the like which does not permit relative axial movement between the rotary shaft and other circumferential parts can be utilized as the rotary shaft seal means.

A plurality of cylindrical pipes can be provided between the casing and the rotary shaft seal means to allow longer movement in the axial direction of the rotary shaft. The cylindrical pipes are telescopically arranged and one or more additional seals movable in the axial direction are mounted for sealing the gaps between them.

DETAILED DESCRIPTION OF THE PREFERRED EMBODIMENTS

Figure 1:
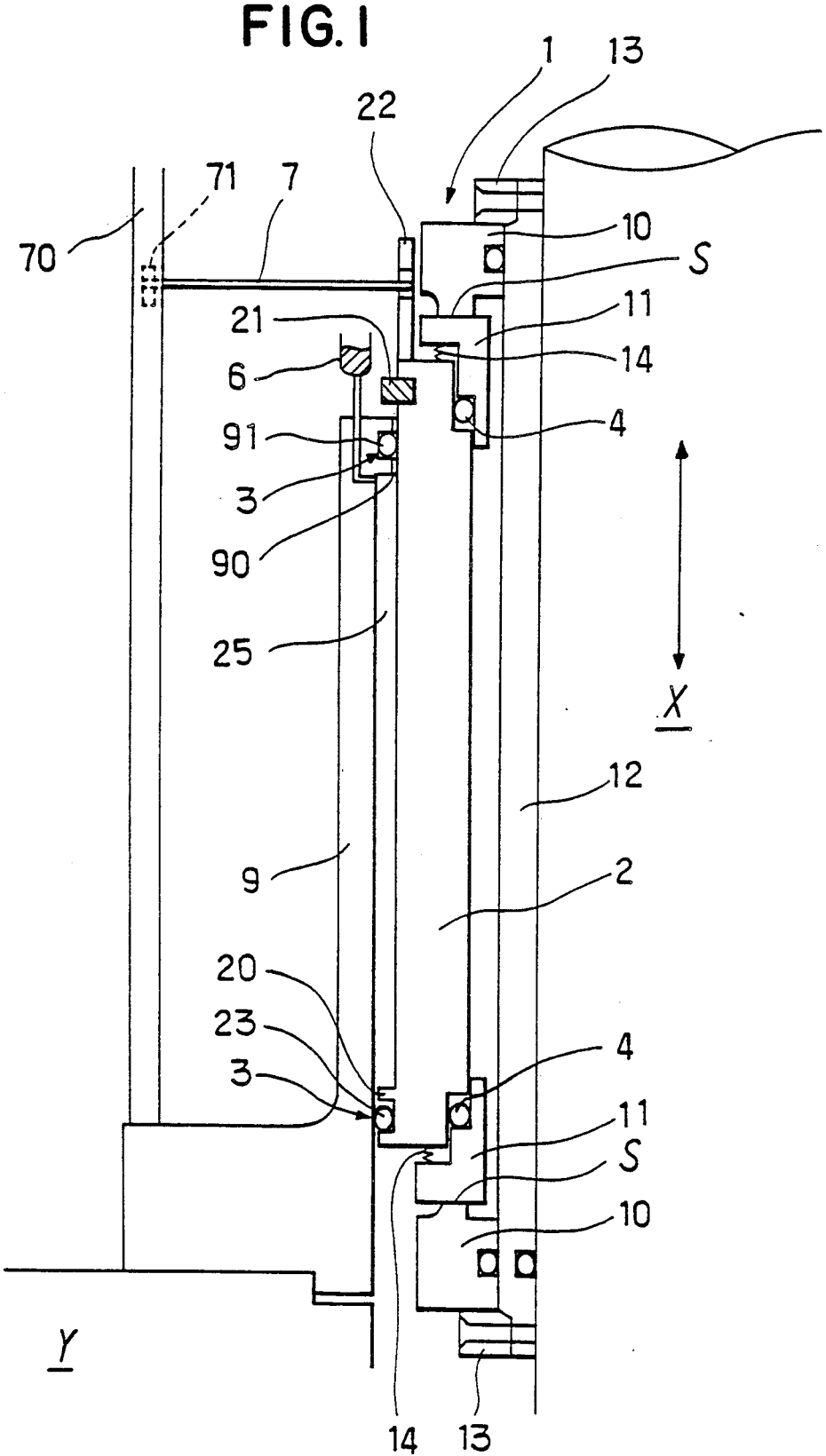
FIG. 1 is a half sectional view of an embodiment of the invention.

In FIG. 1, X designates the rotary shaft of an agitating machine Y or the like. The rotary shaft X moves up and down in the axial direction. The device Y includes a substance to be stirred by a blade attached to the end of the rotary shaft X.

The rotary shaft X is provided with a sleeve 12, upon which a rotary shaft seal means 1 is mounted. The rotary shaft seal means 1 is a double mechanical seal in the embodiment of FIG. 1. Sealing faces S are formed at both end of the sleeve 12 by rotatable rings 10 and non rotatable rings 11 symmetrically mounted on the sleeve 12. An O ring is provided between the sleeve 12 and the rotatable rings 10 and the rotatable rings 10 are secured on the rotary shaft X together with the sleeve 12 by a stopper 13.

A casing 9 is mounted on the device Y as a separate element at the top end thereof extending upwardly in the axial direction. The casing 9 may be integrally formed with the device Y as a portion thereof. The non rotatable rings 11 are not mounted directly on the casing 9 (as would be done if the same manner as a general mechanical seal construction were employed), but rather a cylindrical pipe 2 is arranged between the non rotatable ring 11 and the casing 9. The non rotatable rings 11 are inserted in the inner circumference of the cylindrical pipe 2 with a second seal 4, which is an O ring. (A first seal 3 is referred to hereinafter.) Each of the non rotatable rings 11 is pressed by a spring 14 respectively toward the corresponding rotatable ring 10.

The cylindrical pipe 2 is movable in the axial direction with respect to the casing 9. The gap between the cylindrical pipe 2 and the casing 9 is sealed by at least one first seal 3. In the embodiment of FIG. 1 the first seals 3 are provided on two portions of the cylindrical pipe 2: namely, at the top and bottom ends. The upper first seal 3 consists of a projecting groove 90 projecting at the inner side of the top end of the casing 9, and an O ring 91 is inserted in the projecting groove 90. The lower first seal 3 consists of a projecting groove 20 projecting from the outer side of the end of the cylindrical pipe 2, and an O ring 23 is mounted in the projecting groove 20. The O ring 91 and the O ring 23 so touch and slide on the outer face of the cylindrical pipe 2 and the inner face of the casing 9 respectively that the cylindrical pipe 2 can move in the axial direction with respect to the casing 9 sealing the gap therebetween.

A space 25 formed between the cylindrical pipe 2 and the casing 9 is so filled with lubricant as to provide smooth movement of the cylindrical pipe 2 in the axial direction and as to protect the O rings 91, 23. Since the space 25 increases or decreases its volume accordingly as the cylindrical pipe 2 moves in the axial direction, the space 25 is not closed but so communicates with a lubricant source 6 (which is an oil pot or the like) as to respond to the change of volume.

A stopper 21 is secured on the cylindrical pipe 2 at the top end thereof. The stopper 21 abuts the casing 9 to restrict the downward movement of the cylindrical pipe 2. An extension 22 projects from the top end of the cylindrical pipe 2. The extension 22 has a hole in which a rotation stopper 7 is inserted.

A guide rail 70 parallel to the rotary shaft X extends from the casing 9. The rotation stopper 7 has a wheel 71 which is slidably inserted in the guide rail 70 at the top end in order to prevent rotation of the cylindrical pipe 2. The length of the guide rail 70 may be decided upon considering the stroke of the cylindrical pipe 2 in the axial direction.

Figure 2:
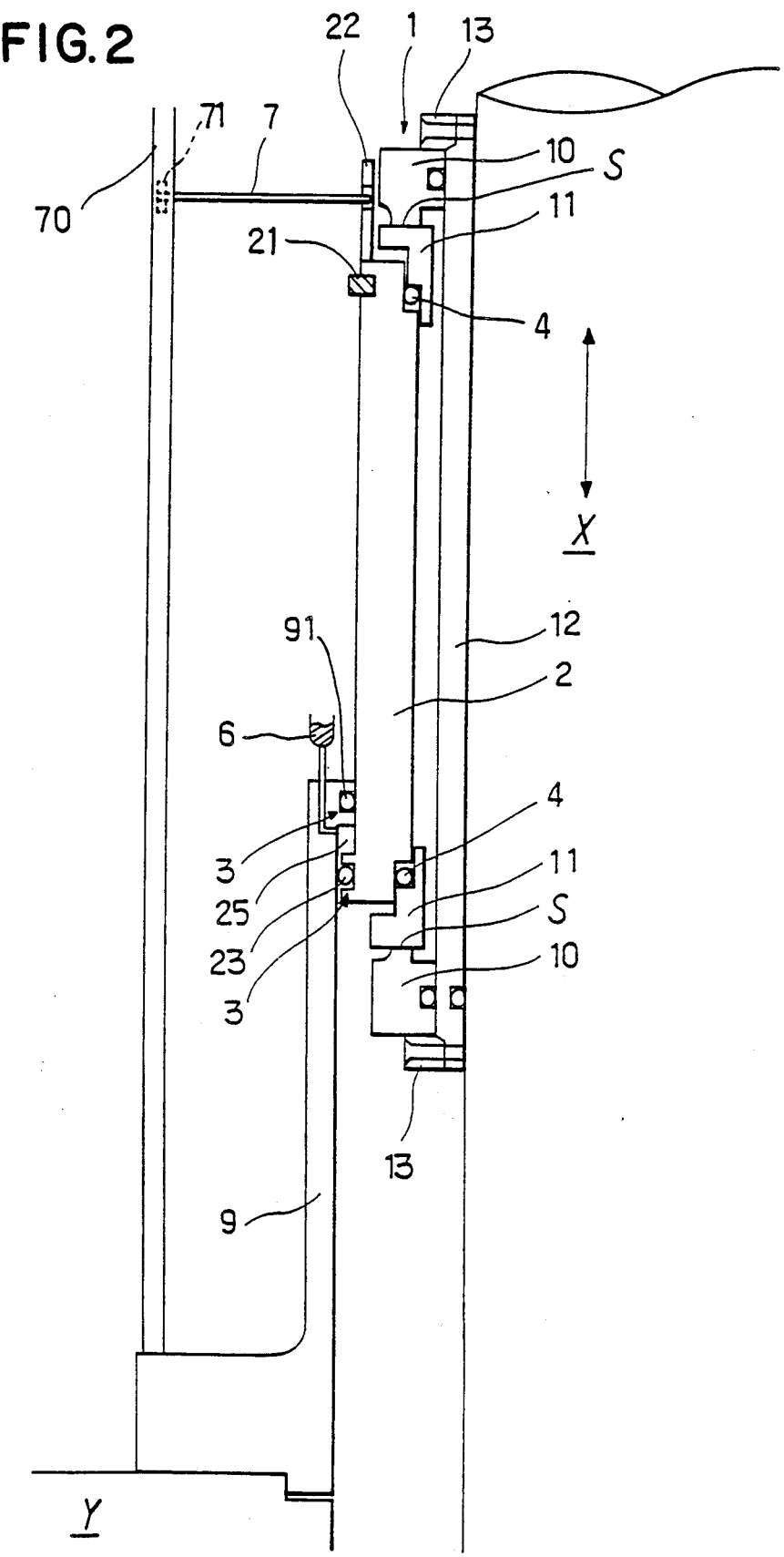
FIG. 2 is a half sectional view explaining the operation of the embodiment of FIG. 1.

When the rotary shaft X moves in the axial direction, the rotatable rings 10 and the sleeve 12 also move in the same direction. Then the non rotatable rings 11 and the cylindrical pipe 2 follow and move in the axial direction as shown in FIG. 2. During the movement, the cylindrical pipe 2 slides upon its contact with the casing 9 and the rotation stopper 7 slides by means of the wheel 71 in the guide rail 70. The first seals 3 securely seals the gap between the cylindrical pipe 2 and the casing 9; that is to say the O ring 91 and the O ring 23 touch on the counter surfaces, sliding in the axial direction. Such function enables the cylindrical pipe 2 to move while keeping the seal of the gap. The movement of the cylindrical pipe 2 is more smooth because the space 25 is filled with lubricant oil or the like in the embodiment of FIG. 1. The changing of the volume of the space 25 can be absorbed by the lubricant source 6, and so the pressure of the lubricant in the space 25 is kept constant.

With such operation, the seal structure can securely follow the movement of the rotary shaft X in the axial direction.

Figure 3:
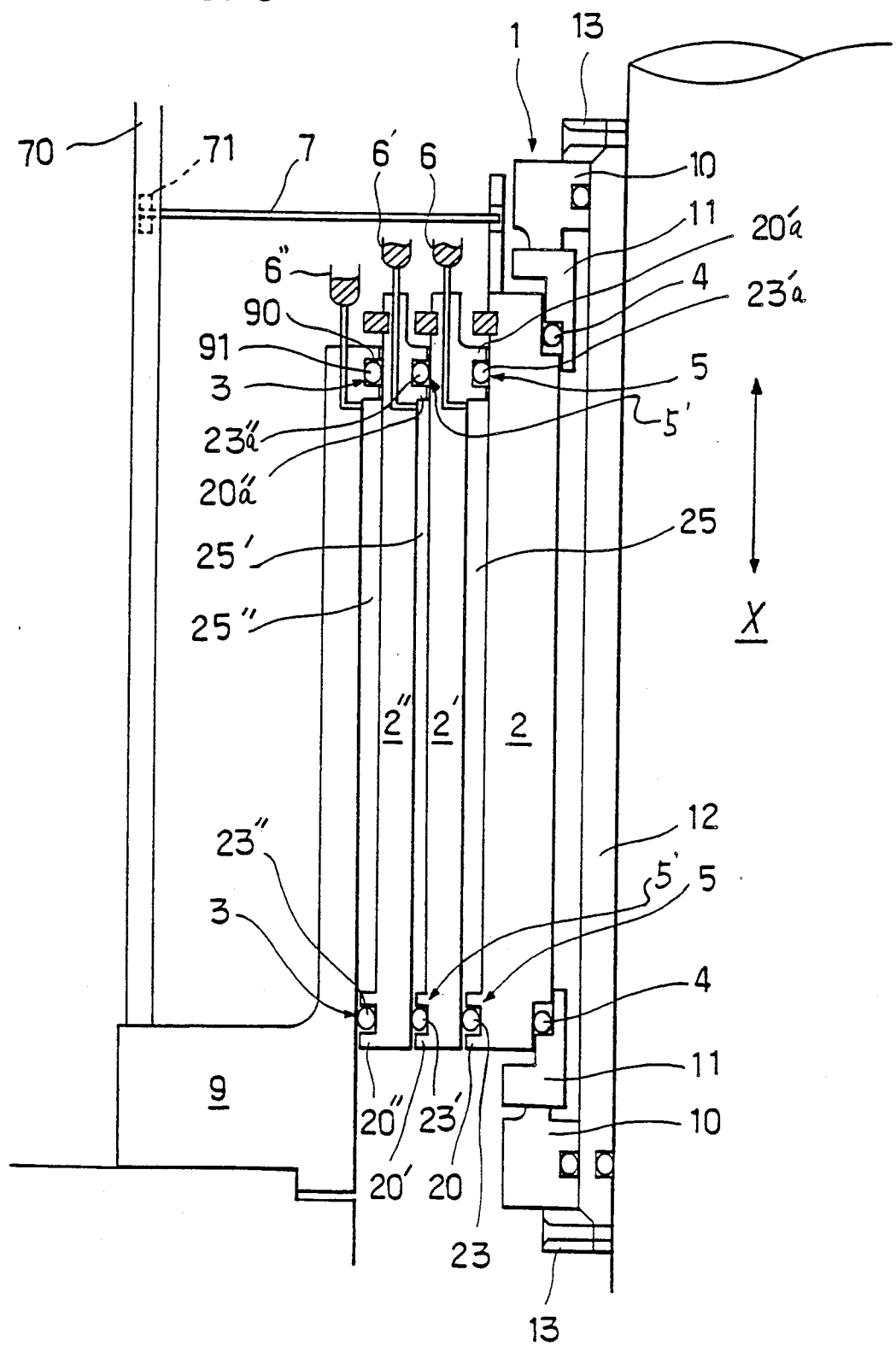
FIG. 3 is a half sectional view of another embodiment of the invention.

Another embodiment is shown in FIG. 3, in which a plurality of cylindrical pipes 2, 2' and 2" are telescopically arranged to follow a long stroke of the movement of the rotary shaft X.

The non rotatable rings 11 are mounted on the cylindrical pipe 2 with the second seals 4 in the same manner as shown in FIG. 1. Furthermore the embodiment of FIG. 3 has a cylindrical pipe 2' and a cylindrical pipe 2" arranged between the cylindrical pipe 2 and the casing 9.

Between the cylindrical pipe 2 and the cylindrical pipe 2', and between the cylindrical pipe 2' and the cylindrical pipe 2", third seals 5 and 5' are respectively mounted at the upper end and the lower end of said pipes to seal the gaps between said pipes while keeping the cylindrical pipes movable in the axial direction.

At the lower end of the cylindrical pipe 2, the projecting groove 20 projecting from the outer surface and the O ring 23 inserted therein are mounted in the same manner as in the case of the embodiment shown in FIG. 1. The O ring 23 slidably touches the inner surface of the cylindrical pipe 2' to seal the gap between the pipe 2 and the pipe 2'. The inner side of the cylindrical pipe 2' is provided with a projecting groove 20'$a$ at the upper end, in which an O ring 23'$a$ is inserted to slidably touch the outer surface of the cylindrical pipe 2. Said projecting groove 20, O ring 23, projecting groove 20'$a$ and O ring 23'$a$ form third seals 5 for sealing the gap between the cylindrical pipe 2 and the cylindrical pipe 2' and the space 25 therebetween. The space 25 is filled with lubricant oil and is connected with a lubricant source 6 to respond to the changes in the volume of the space 25 in the same manner as shown in FIG. 1.

The third seals 5' between the cylindrical pipe 2' and the cylindrical pipe 2" have the same construction as said third seals 5. The third seals 5' each comprises a projecting groove 20' projecting at the lower end of the outer face of the cylindrical pipe 2' and an O ring 23' inserted therein, a projecting groove 20"$a$ projecting at the upper end of the inner face of the cylindrical pipe 2" and an O ring 23"$a$ inserted therein. The third seals 5' forms a space 25' between the cylindrical pipe 2' and the cylindrical pipe 2", which is filled with lubricant oil. The space 25' is connected with a lubricant source 6'.

The gap between the cylindrical pipe 2" and the casing 9 is sealed by the first seals 3. A projecting groove 20" and an O ring 23" are mounted on the cylindrical pipe 2" at the lower end of the outer face thereof. The O ring 23" is slidably in contact with the inner face of the casing 9 for sealing while permitting movement in the axial direction. Furthermore the projecting groove 90 is provided on the casing 9 at the upper end of the inner face, in which the O ring 91 is inserted. The O ring 91 slidably touches the outer face of the cylindrical pipe 2" to seal and permit movement in the axial direction. A space 25" is formed between the cylindrical pipe 2" and the casing 9, which is filled with lubricant oil. The space 25" is connected with a lubricant source 6" to respond the change of the volume thereof.

Though the embodiment of FIG. 3 includes three pieces of cylindrical pipe 2, 2' and 2" the seal structure of the invention can have more or less pieces of the cylindrical pipe 2, etc. according to the necessary length of the stroke.

The O rings in the seals 3, 4, 5 of the embodiments shown in FIG. 1 and FIG. 3 can be substituted by any other seal which is movable in the axial direction, for example a magnetic liquid seal or the like.

Figure 4:
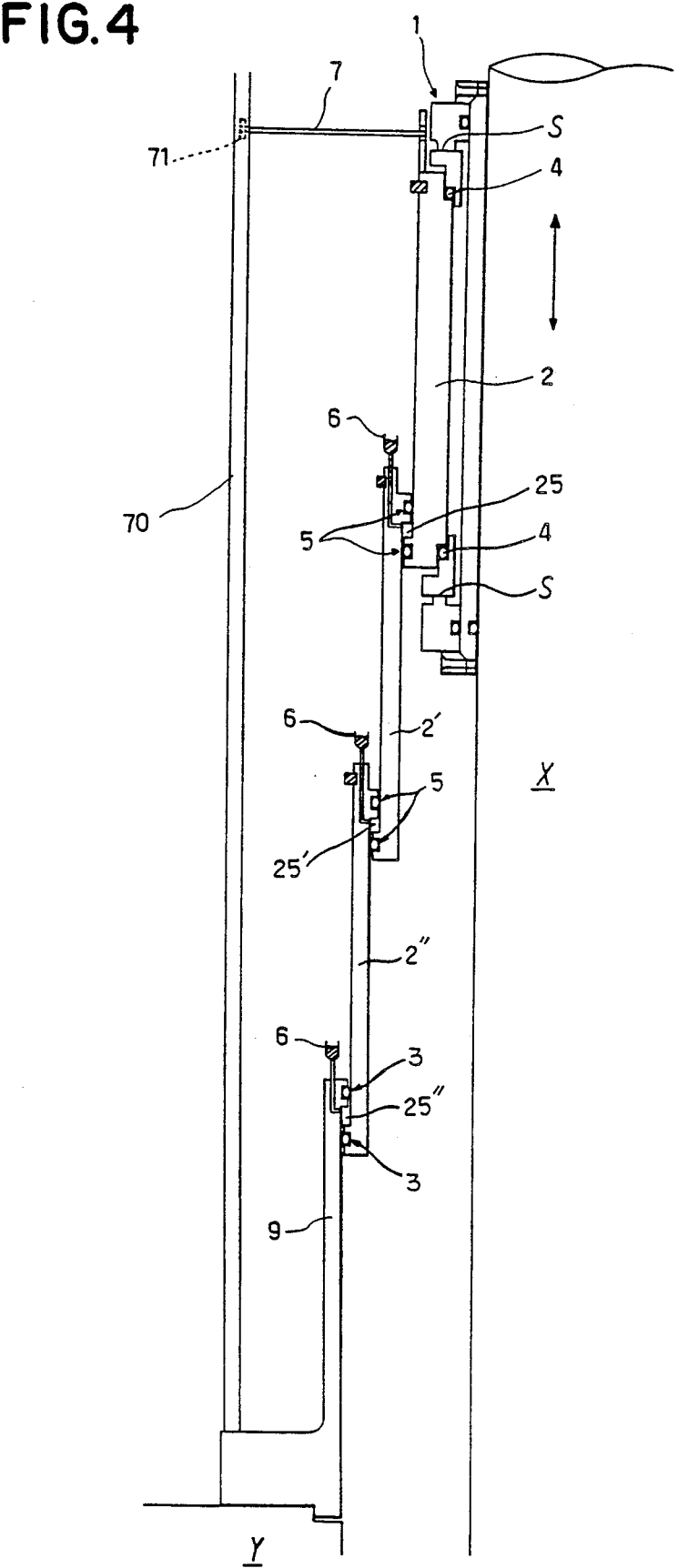
FIG. 4 is a half sectional view explaining the operation of the embodiment of FIG. 3.

FIG. 4 shows the operation of said embodiment shown in FIG. 3. When the rotary shaft X moves in the axial direction, the cylindrical pipe 2 follows the axial movement and slides with respect to the cylindrical pipe 2'. Then the cylindrical pipe 2' moves with respect to the cylindrical pipe 2", and the cylindrical pipe 2" moves with respect to the casing 9 keeping the function of sealing. Thus the seal structure can respond to the axial movement of the rotary shaft X.

As explained above, the seal structures shown in FIGS. 1 and 3 can expand and contract in the axial direction following the axial movement of the rotary shaft X because of the movement of the cylindrical pipe 2, etc. with respect to the casing 9. Since the gap between the cylindrical pipe 2, etc. and the casing 9 is sealed by the first seals 3 and the gap between the cylindrical pipe 2 and the rotary shaft seal means 1 is sealed by the second seals 4, the substance in the device does not leak out through such gaps. Furthermore the rotary shaft seal means 1 is not influenced by the axial movement of the rotary shaft X, and therefore a seal means immovable in the axial direction such as a mechanical seal can be utilized as the rotary shaft seal means 1. A labyrinth seal, a neck bush seal, and segment seal or the like may also be used as the rotary shaft seal means 1.

What is claimed is:

1. A seal structure for sealing a rotary shaft which is movable in the axial direction and extends from a casing and comprising in combination, said rotary shaft and said casing about said shaft, said casing having an upper end and a lower end;
    a cylindrical pipe having an upper end and a lower end provided between said casing and said rotary shaft, movable in the axial direction in axial synchronism with said rotary shaft;
    a rotary seal component mounted around said rotary shaft and movable in the axial direction in axial synchronism with said rotary shaft and said cylindrical pipe, said rotary seal component providing a seal between said rotary shaft and said cylindrical pipe;
    an upper first seal affixed to said casing at said upper end thereof and movable in the axial direction with respect to said cylindrical pipe, for sealing off a space between said casing and said cylindrical pipe at said upper end of said casing;
    a lower first seal secured on said cylindrical pipe at said lower end thereof and movable in the axial direction with respect to said casing, for sealing off said space between said cylindrical pipe and said casing at said lower end of said cylindrical pipe;
    the volume of said space between said pipe and said casing being variable as a result of the movement of said rotary shaft in the axial direction.

2. A seal structure of claim 1 wherein lubricating liquid is filled in the space between the cylindrical pipe and the casing.

3. A seal structure for sealing a rotary shaft which is movable in the axial direction and extends from a casing and comprising in combination, said rotary shaft and said casing about said shaft, said casing having an upper end and a lower end;
    a plurality of telescoping cylindrical pipes each having an upper end and a lower end, said pipes axially oriented with said upper end and said lower end of said casing and provided between said casing and said rotary shaft, and movable in the axial direction and each of them having respectively different diameters;
    the innermost cylindrical pipe being movable in axial synchronism with the rotary shaft;
    a rotary seal component mounted around said rotary shaft and movable in the axial direction in axial synchronism with said rotary shaft and said innermost cylindrical pipe, said rotary seal component providing a seal between said rotary shaft and said innermost cylindrical pipe;
    an upper first seal affixed to said casing at one end thereof and permitting relative movement of the outermost cylindrical pipe in the axial direction with respect to said casing, for sealing off a space between said casing and said outermost cylindrical pipe at said upper end of said casing;
    a lower first seal affixed to said outermost cylindrical pipe at said lower end thereof and movable in the axial direction with respect to said casing, for sealing off the space between said outermost cylindrical pipe and said casing at said lower end of said outermost cylindrical pipe;
    additional pairs of seals for sealing off spaces between pairs of adjacent pipes of and said cylindrical pipes, each said pair comprising an upper first seal affixed to one cylindrical pipe at its first end and movable with respect to the adjacent cylindrical pipe and a lower first seal affixed to the adjacent cylindrical pipe at its lower end and movable with respect to said one cylindrical pipe;
    the volume of said spaces between said pipes and said casing being variable as a result of the movement of said rotary shaft in the axial direction.

4. A seal structure of claim 3 wherein lubricating liquid is filled in the space between the outermost cylindrical pipe and the casing and in the spaces between the cylindrical pipes.

5. A seal structure of claim 1 or claim 3 wherein said rotary seal component is a mechanical seal.

6. A seal structure of claim 1 or claim 3 wherein said rotary seal component is a double mechanical seal.

7. A seal structure of claim 2 or 4 wherein each of said spaces is connected with a lubricant source which responds to the change of the volume thereof.

* * * * *